(12) United States Patent
Hawksworth et al.

(10) Patent No.: US 12,313,149 B2
(45) Date of Patent: May 27, 2025

(54) ACTUATOR OVERTRAVEL STOP ASSEMBLY

(71) Applicant: Goodrich Actuation Systems Limited, Solihull (GB)

(72) Inventors: Andrew Hawksworth, Newport (GB); Lee Slater, Dudley (GB)

(73) Assignee: GOODRICH ACTUATION SYSTEMS LIMITED, Solihull (GB)

( * ) Notice: Subject to any disclaimer, the term of this patent is extended or adjusted under 35 U.S.C. 154(b) by 104 days.

(21) Appl. No.: 18/176,705

(22) Filed: Mar. 1, 2023

(65) Prior Publication Data
US 2023/0279932 A1 Sep. 7, 2023

(30) Foreign Application Priority Data
Mar. 2, 2022 (EP) .................................. 22275024

(51) Int. Cl.
*F16H 25/20* (2006.01)

(52) U.S. Cl.
CPC . *F16H 25/2015* (2013.01); *F16H 2025/2031* (2013.01); *F16H 2025/204* (2013.01)

(58) Field of Classification Search
CPC ..... F16H 2025/2065; F16H 2025/2068; F16H 25/2015; F16H 2025/2071; F16D 1/0876
See application file for complete search history.

(56) References Cited

U.S. PATENT DOCUMENTS

| | | | |
|---|---|---|---|
| 2,541,529 A * | 2/1951 | McVicker | F16H 25/20 74/625 |
| 9,604,717 B2 | 3/2017 | Coffman | |
| 11,060,566 B2 | 7/2021 | Meyer et al. | |
| 11,618,112 B2 * | 4/2023 | Graham | F16D 1/0876 29/402.08 |
| 2021/0016903 A1 | 1/2021 | VanBuskirk | |
| 2021/0293312 A1 * | 9/2021 | Hawksworth | F16H 25/2015 |

FOREIGN PATENT DOCUMENTS

| | | |
|---|---|---|
| EP | 3196509 A2 | 7/2017 |
| EP | 3196509 A3 | 8/2017 |
| EP | 3882486 A1 | 9/2021 |

OTHER PUBLICATIONS

European Search Report for Application No. 22275024.2, mailed Jul. 28, 2022, 9 pages.

* cited by examiner

*Primary Examiner* — Gregory Robert Weber
(74) *Attorney, Agent, or Firm* — CANTOR COLBURN LLP

(57) ABSTRACT

An actuator assembly includes a compliant actuator shaft having an axis (A) and a first end and a second end, a drive assembly provided at the first end of the compliant actuator shaft to cause rotation of the compliant actuator shaft about the axis and an overtravel stop mechanism. The overtravel stop mechanism includes: a screw shaft mounted to and arranged to rotate with the second end of the compliant actuator shaft, the screw shaft having an outer thread extending in the axial direction; a nut threadedly mounted to the outer thread of the screw shaft that moves axially relative to the screw shaft as the screw shaft rotates; a first stop fixed to and radially extending from the screw shaft to define the axial limit of movement of the nut relative to the screw shaft, in a first axial direction.

12 Claims, 1 Drawing Sheet

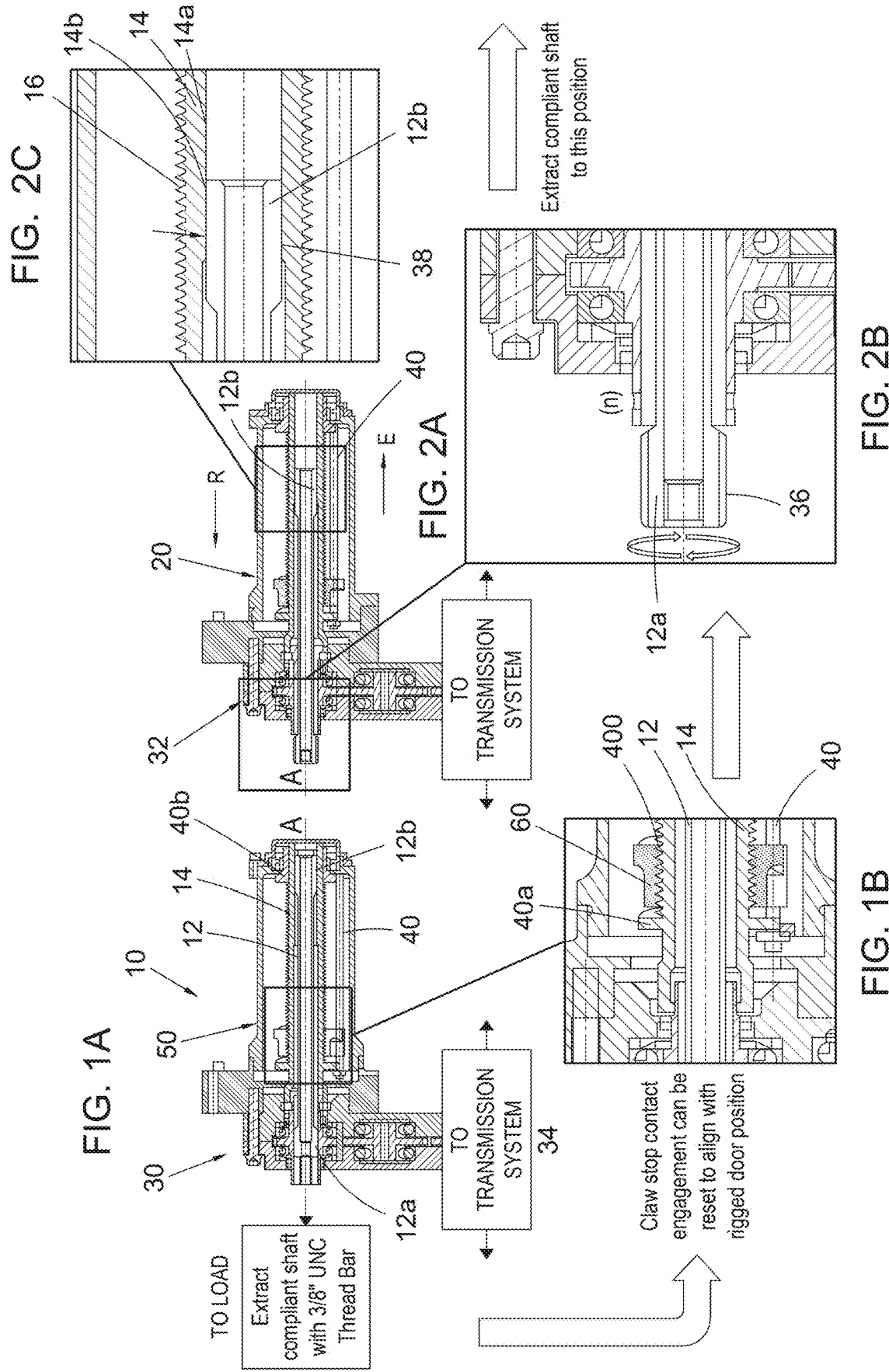

ACTUATOR OVERTRAVEL STOP ASSEMBLY

CROSS-REFERENCE TO RELATED APPLICATIONS

This application claims priority to European Patent Application No. 22275024.2 filed Mar. 2, 2022, the entire contents of which is incorporated herein by reference.

TECHNICAL FIELD

The present disclosure is concerned with an actuator assembly having an overtravel stop assembly, for example for actuators used for movement and/or positioning of aircraft components or surfaces such as flight control surfaces or doors.

BACKGROUND

Actuators are used in many fields to control the movement and/or positioning of a surface or component. Various types of actuator including hydraulic actuators, electrohydraulic actuators, electromechanical actuators and electrical actuators are known. Typically, an actuator will include a moveable shaft that is connected to the surface or component to be moved, as well as being connected to a drive. Conventionally, the drive will cause rotation of a shaft at an appropriate speed and by a commanded degree of rotation. In a rotary actuator, the shaft rotation will be transferred to rotation of a component or surface (e.g. an aircraft wing flap or panel) connected to the shaft. In linear actuators, the rotation of the shaft is converted to linear motion of an actuator member e.g. a screw shaft which, in turn, causes linear motion of a connected component or surface. In either case, particularly in high load systems, it is desirable to provide an overtravel stop mechanism that prevents excessive rotational or linear motion of the actuator parts. Such stops are often crucial to prevent inappropriate positioning and/or structural damage.

Various types of stop mechanism are known, including stops that prevent overtravel by the engagement of stop teeth and overtravel systems that use electrical switches as limits. The stops are generally set based on the permissible range of movement of the controlled surface or component and will take into account its weight and size and possible speed of movement as well as the actuator stroke. In some cases, however, features of the surface/component or the assembly may mean that the surface/component commences movement some time after the start of the actuator stroke, in which case, the stops may kick in too soon or too late unless they are adjusted to take this into account. Such adjustment is known as rigging. For mechanical stops such as teeth or claw stops, this adjustment requires the overtravel assembly to be disassembled from the drive and shaft assembly which is cost and time intensive.

There is, therefore, a need for an actuator and overtravel stop assembly that allows for simplified rigging adjustment.

SUMMARY

Accordingly, there is provided an actuator assembly comprising: a compliant actuator shaft having an axis and a first end and a second end; a drive assembly provided at the first end of the compliant actuator shaft to cause rotation of the compliant actuator shaft about the axis; an overtravel stop mechanism comprising: a screw shaft, coaxial with the compliant actuator shaft, and mounted to and arranged to rotate with the second end of the compliant actuator shaft, the screw shaft having an outer thread extending in the axial direction; a nut threadedly mounted to the outer thread of the screw shaft and arranged to move axially relative to the screw shaft as the screw shaft rotates; a first stop fixed to and radially extending from the screw shaft to define the axial limit of movement of the nut relative to the screw shaft, in a first axial direction, as the screw shaft rotates, by abutment of the nut against the first stop; and wherein the first end of the compliant actuator shaft is provided with a first number n of splines for spline engagement with the drive assembly and the second end of the compliant actuator shaft is provided with a second number of splines, the second number being one spline more than the first number of splines, for spline engagement with the screw shaft.

BRIEF DESCRIPTION

Examples according to the description will now be described with reference to the drawings. It should be noticed, that these are only examples, and variations are possible within the scope of the claims. In the drawings:

FIG. 1A is a cross sectional view of part of an actuator assembly and overtravel stop assembly in accordance with the disclosure;

FIG. 1B is a detail of FIG. 1A showing the overtravel stops in more detail;

FIG. 2A is a cross section of the assembly of FIG. 1A for explaining the overtravel stop assembly adjustment;

FIG. 2B shows a detail of one end of FIG. 2A; and

FIG. 2C shows a detail of the other end of FIG. 2A.

DETAILED DESCRIPTION

An assembly according to this disclosure will now be described in more detail, by way of example.

FIGS. 1A and 2A show part of an actuator assembly 10 including the overtravel stop assembly 20. The assembly includes a shaft 12 defining an axis A and having a first end 12a in contact with a drive assembly 30, such that the shaft 12 is rotated by the drive assembly 30 about its axis A, and a second end 12b in contact with a load (not shown) to be moved by the actuator assembly.

In the example shown, the shaft 12 is driven by a drive assembly 30 comprising a gear system 32 that, in turn, is connected to a transmission system 34 driven by e.g. a motor (not shown). In this example, the gear system is a drop down gear box 32 to rotate the shaft 12, connected to the gear box, in response to, but at lower rotational speed, than the motor and transmission system. The shaft 12 is connected to the gear system 32 by a first spline arrangement 36 between the first end 12a of the shaft and the gear system 32 such that, when the splines 36 around the first end 12a of the shaft 12 engage with the gear of the gear system 32, rotation of the gear system causes corresponding rotation of the shaft 12.

The other end 12b of the shaft engages, by means of a second spline arrangement 38, a screw shaft 14 mounted axially around the shaft 12. Splines of the second spline arrangement, around the second end of the shaft, engage with an interior 14a of the screw shaft 14 such that, when the splines are engaged, rotation of the shaft 12 causes corresponding rotation of the screw shaft 14.

The screw shaft 14 is provided, along (in the axial direction) its outer surface 14b, with teeth or threads 16 that protrude radially outwards.

A nut 60, attached to rods 40, that earth the rotation of the nut, is mounted around the screw shaft 14 but is not rotationally attached to the screw shaft 14 or the shaft 12. The nut 60 has an interior thread that engages the outer thread 16 of the screw shaft 14, so that as the screw shaft 14 rotates about axis A, the nut 60 translates along the rods 40, and rides along the thread, thus moving axially relative to the shaft 12. The direction of axial movement of the nut 60 depends on the direction of rotation of the screw shaft.

For linear actuators, the nut 60 and rods 40 may be the part of the actuator assembly connected to the load i.e. the surface or component to be moved. Rotation of the shaft by the drive causes linear/axial movement of the nut and corresponding movement of the surface/component. The assembly also includes an overtravel stop assembly 20 as will be described further below.

The stop assembly comprises a first stop 40a which is a radial projection from the screw shaft 14 at an end position beyond which the actuator stroke should not continue. For a linear actuator, this defines the limit of axial motion of the nut 60 based on the limit of desired movement of the surface/component. In the example shown, the first stop 40a is a stop to define the end of axial movement in the retracting direction R of the screw shaft—i.e. retracting axially into the actuator housing 50. In addition, or alternatively, a similar stop 40b may be provided at the other end of the screw shaft 14 to limit axial movement in the extending direction E. The first stop 40a is fixed relative to the screw shaft 14.

The nut 60 is provided with an interior thread 400 that threadingly engages with the thread 16 of the screw shaft 14. Thus, the nut travels along the screw shaft 14 as the screw shaft rotates. At the desired extent of travel of the nut 60, it abuts against the first stop 40a which prevents further axial movement of the nut 60 in that direction.

In typical assemblies, the shafts are designed and arranged, and the stops are set at positions, based on the types, ranges of motion, size and weight of the loads being driven and characteristics of the drive, to ensure that the length of the actuator stroke as defined by the stops corresponds to the desired movement of the surface/component being moved. This assumes that the start of the actuator stroke—i.e. the start of rotation/axial movement—corresponds to the start of movement of the surface/component. Often, the positioning of the actuator and its stroke will need to be adjusted or 'rigged'. Rigging usually requires the actuator assembly to be disconnected from the transmission and from the surface/component and the screw shaft and stops to be disassembled and re-positioned.

Further, in high speed/high load systems, the speed at which the actuator moves results in the stops abutting at high speed as the actuator reaches it end limit(s). This high impact can cause undesired vibrations etc. and can even damage structural parts of the assembly. In existing assemblies, adaptations have been made to reduce this end of stroke impact by. E.g. incorporating damping springs in the system or controlling the system to adjust the speed of the actuator before impact. Such solutions, however, typically use separate devices in the system to performing the damping or decelerating function, which results in a larger, heavier and more expensive assembly.

The arrangement of this disclosure allows a simple rigging adjustment process whereby the start point between the transmission stroke and application to movement of the surface/component can be more easily and accurately calibrated and adjusted. Further, the impact at the stops of the overtravel stop assembly is reduced without the need for additional parts dedicated to this function. This is achieved by virtue of the shaft 12 being a compliant shaft having a set of two adjoining splines having one tooth difference in spline count and providing a fine adjustment feature. In other words, there is a single tooth difference between the spline assembly at one end of the shaft 12 and the spline assembly at the other end. The shaft 12 is designed to introduce a specific stiffness by virtue of its length, cross-sectional area and material properties, which can be tuned within the boundaries of the transmission system inertia during the concept stage of the assembly design to absorb potential yield cases within the transmission system.

The features according to the disclosure that provide the above capabilities can best be seen in the examples shown in FIGS. 1C, 2B and 2C, with reference to FIGS. 1 and 2.

In FIG. 1, the shaft 12 is located within the assembly housing 50 with its first end 12a in spline engagement with the drive gear system 32. The first end 12a is formed with the first spline arrangement 36 having n splines. The compliant shaft 12 extends through the assembly and its second end 12b is in spline engagement with the screw shaft 14. The second spline arrangement 38 has 1 more (n+1) spline than the first spline arrangement. FIG. 1 shows the assembly with the actuator in fully retracted position where the nut and the stop 40a are engaged to stop further axial movement of the nut 60 in the retraction direction. Rotation of the shaft 12 in the opposite direction would cause the nut 60 to move axially in the extension direction E. Further stops 40b may be provided to limit axial movement in the extension direction E.

If, for whatever reason, the stroke of the actuator as defined by the stops in their present positions, does not match the required movement of the controlled surface/component, the stops can be reset such that they engage to align with the rigged surface/component position.

To do this, the first end 12a of the compliant shaft 12 is disengaged from spline engagement with the drive gear system 32 by drawing the first end 12a of the shaft axially out of the drive gear system in the R direction. The first end is extracted from the gear system e.g. by means of a tool such as a thread bar which may be inserted into the end of the compliant shaft to pull it out of the gear system. Because the second end 12b of the shaft 12 has n+1 splines, however, when the first end splines have disengaged with the gear system, the second end splines still maintain engagement with the screw shaft 14, as shown in FIG. 2C. As the shaft 12 is now no longer in rotational engagement with the gear system and, hence, with the drive assembly, the screw shaft 14 can be independently rotated to determine the stroke required for the desired starting position of the surface/component and to adjust the position of the nut 60 on the screw shaft, thus adjusting when it will abut against the first stop 40a when the shaft is re-connected to the drive assembly.

Once the stop position has been adjusted as required, the first end 12a of the compliant shaft re-connects with the drive mechanism via the first spline arrangement. The contact accuracy of the adjusted stop 40a will be less than the size of one spline tooth. This accuracy is achieved by calculating the difference between the spline pitch values of n teeth at the first end 12a and n+1 teeth at the second end 12b. The pitch of the teeth of the first spline arrangement 36 is equal to 360 deg./n and the pitch of the teeth of the second spline arrangement 38 is equal to 360 deg./n+1. The accuracy of the adjusted contact is equal to half of the difference between the pitch of the first teeth and the pitch of the second teeth.

Using the arrangement of this disclosure improves the accuracy of the positioning of the surface or component being moved e.g. an aircraft surface or door structure. The arrangement allows simple but precise adjustment, which can be made during installation of the assembly and without disassembling the entire actuator.

The invention claimed is:

1. An actuator assembly comprising:
   a compliant actuator shaft having an axis and a first end and a second end;
   a drive assembly provided at the first end of the compliant actuator shaft to cause rotation of the compliant actuator shaft about the axis;
   an overtravel stop mechanism comprising:
      a screw shaft, coaxial with the compliant actuator shaft, and mounted to and arranged to rotate with the second end of the compliant actuator shaft, the screw shaft having an outer thread extending in an axial direction;
      a nut threadedly mounted to the outer thread of the screw shaft and arranged to move axially relative to the screw shaft as the screw shaft rotates; and
      a first stop fixed to and radially extending from the screw shaft to define the axial limit of movement of the nut relative to the screw shaft, in a first axial direction, as the screw shaft rotates, by abutment of the nut against the first stop;
   wherein:
      the first end of the compliant actuator shaft is provided with a first number n of splines for spline engagement with the drive assembly; and
      the second end of the compliant actuator shaft is provided with a second number of splines, the second number being one spline more than the first number of splines, for spline engagement with the screw shaft.

2. The actuator assembly as claimed in claim 1, wherein the drive assembly comprises a gear system connected to a transmission system.

3. The actuator assembly as claimed in claim 2, wherein the gear system rotates the compliant actuator shaft at a lower rotational speeds than the transmission system rotates.

4. The actuator assembly as claimed in claim 1, further comprising:
   rods to which the nut is attached.

5. The actuator assembly as claimed in claim 1, further comprising:
   an assembly housing within which the compliant actuator shaft is located.

6. The actuator assembly as claimed in claim 1, further comprising:
   a motor to drive the drive assembly.

7. The actuator assembly of claim 6, wherein the motor is an electric motor.

8. The actuator assembly as claimed in claim 1, further comprising:
   a second stop radially extending from the screw shaft to define an axial limit of movement of the nut relative to the screw shaft in a second axial direction opposite the first axial direction.

9. A method of resetting the overtravel stop mechanism of the actuator assembly of claim 1, the method comprising:
   disengaging the spline engagement of the first end of the compliant actuator shaft from the drive assembly whilst maintaining the spline engagement of the second end of the compliant actuator shaft with the screw shaft; and
   adjusting the position of the nut on the screw shaft.

10. The method of claim 9, further comprising:
    re-engaging the spline engagement of the first end after adjusting the position of the nut.

11. The method of claim 10, wherein the spline engagement of the first end is performed using a threaded tool to engage with and pull the compliant shaft.

12. The method of claim 9, wherein the spline engagement of the first end is performed using a threaded tool to engage with and pull the compliant shaft.

* * * * *